United States Patent [19]
Tsai

[11] Patent Number: 5,148,704
[45] Date of Patent: Sep. 22, 1992

[54] TIRE MONITORING AND REPAIRING DEVICE

[76] Inventor: Yu-Hui Tsai, No. 8, Hou-Kou, Pei-Kung Chen, Yun-Lin Hsien, Taiwan

[21] Appl. No.: 746,358

[22] Filed: Aug. 16, 1991

[51] Int. Cl.5 .......................... B60C 23/02; G01L 7/16
[52] U.S. Cl. ..................................... 73/146.8; 73/714; 73/744; 340/442
[58] Field of Search ...................... 73/146.8, 714, 744; 340/442; 116/34 R

[56] References Cited

U.S. PATENT DOCUMENTS

| | | | |
|---|---|---|---|
| 3,852,839 | 12/1974 | Blessing | 73/146.8 |
| 4,694,691 | 9/1987 | Johnston | 73/146.8 |
| 4,884,175 | 11/1989 | Weng | 73/146.8 |
| 4,970,894 | 11/1990 | Tsai | 73/146.8 |

Primary Examiner—Donald O. Woodiel
Attorney, Agent, or Firm—Matthew K. Ryan

[57] ABSTRACT

A tire monitoring and repairing device comprises a body having a front arm and a rear grip arm interconnected at their upper end with a connecting member to substantially form a U-shape. A pressure gauge is mounted in the front arm and a flash light device is mounted in the rear grip arm. The front arm further has a mouth piece projecting forward to form a pressure inlet. A tire repairing tool is detachably screwed to the mouth piece of the front arm. In addition, a tire tread ruler is provided in the rear grip arm.

6 Claims, 3 Drawing Sheets

TIRE MONITORING AND REPAIRING DEVICE

BACKGROUND OF THE INVENTION

1. Field of the Invention

This invention relates to a tire monitoring and repairing device which incorporates a pressure gauge, a tire repairing tool, a tire tread ruler and a flash light unit.

2. Brief Description of the Prior Art

Pressure gauges and tire tread rulers are useful implements to check the performance of tires. Tire repairing tools which have a forked portion with a converging end are used to repair pierced parts of tiers. Since the above-mentioned devices are indispensable for the safetiness of tires, it is desirable to incorporate them for convenient carrying and storing.

SUMMARY OF THE INVENTION

An object of this invention to provide a multipurposed device which can be employed to monitor the interior pressure of a tire and the depth of the tread of a tire as well as to repair the tire when the tire is pierced.

According to one aspect of the present invention, a tire monitoring and repairing device comprises a body having a front arm having an upper end and a lower end, a rear grip arm having an upper end and a lower end, an upper connecting arm interconnecting the upper ends of the front arm and the rear grip arm such that they substantially form a U-shape, and a lower connecting arm provided below the upper connecting arm and interconnecting the front arm and the rear grip arm. The rear grip arm is hollow and slender and has a lower portion longer than that of the front arm. A pressure gauge is provided in the front arm and has a front side with a mouth piece forming a pressure inlet. A tire repairing tool is detachably mounted on the mouth piece. A flash light device is mounted in the rear grip arm and has a light emitting head provided at the lower end of the rear grip arm.

In another aspect of the invention. The rear grip arm has a flat closed bottom and the light emitting head projects forwardly from the lower end of the rear grip arm. The rear grip arm further has an elongated narrow bore opening at the flat closed bottom. A tire tread ruler is slidably received in the bore and normally projects from the flat closed bottom.

In still another aspect of this invention, the repairing tool has a rear mounting end screwed to the mouth piece and a tool bit having a helical ridge adjacent to the rear mounting end. The tool bit further has a forked portion opposite to the rear mounting end, which forked portion has a converging terminating end.

The present exemplary preferred embodiment will be described in detail with reference to the accompanying drawings, in which:

DETAILED DESCRIPTION OF THE PREFERRED EMBODIMENT

Figure 1:
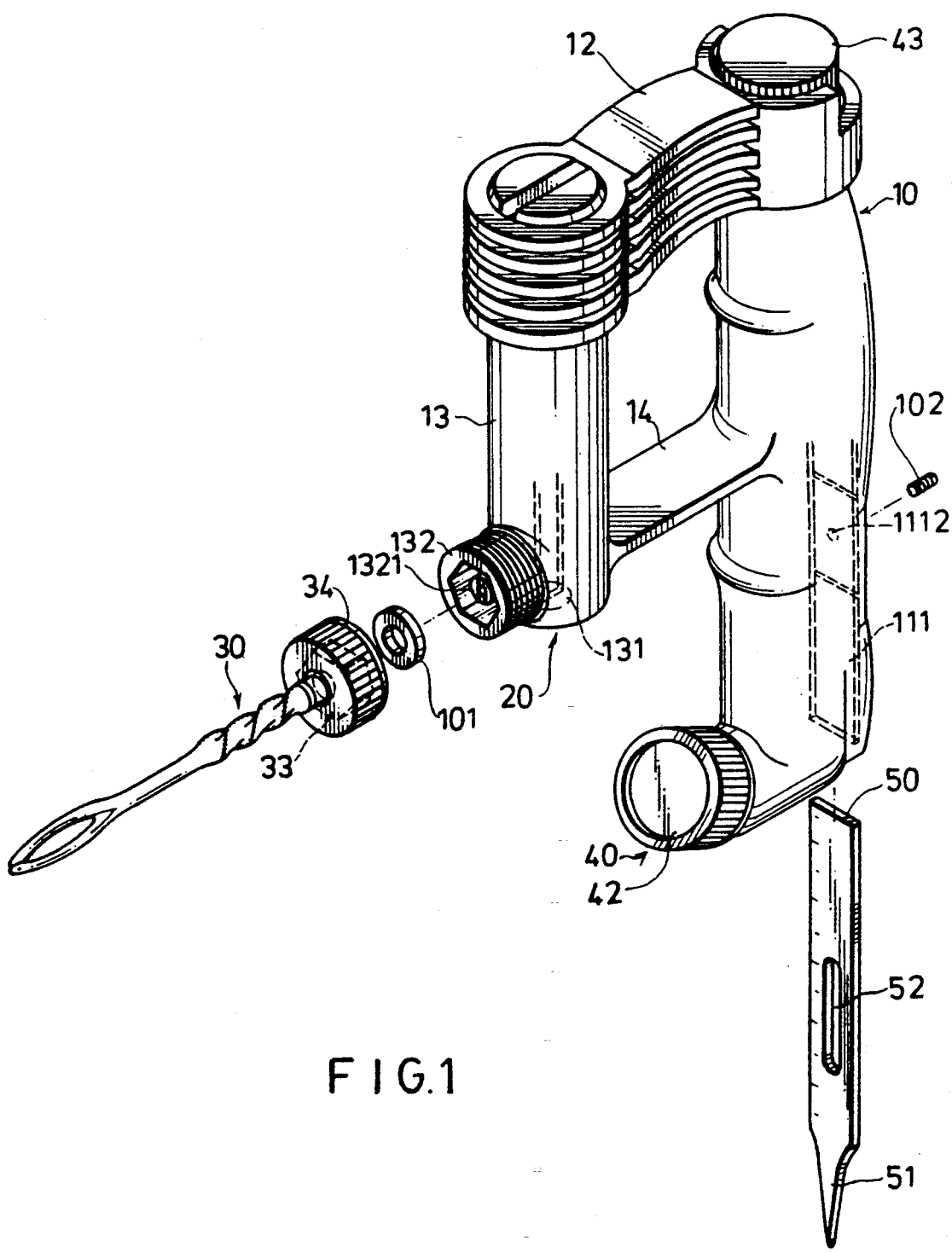
FIG. 1 is an exploded view of a tire monitoring and repairing device.
Figure 2:
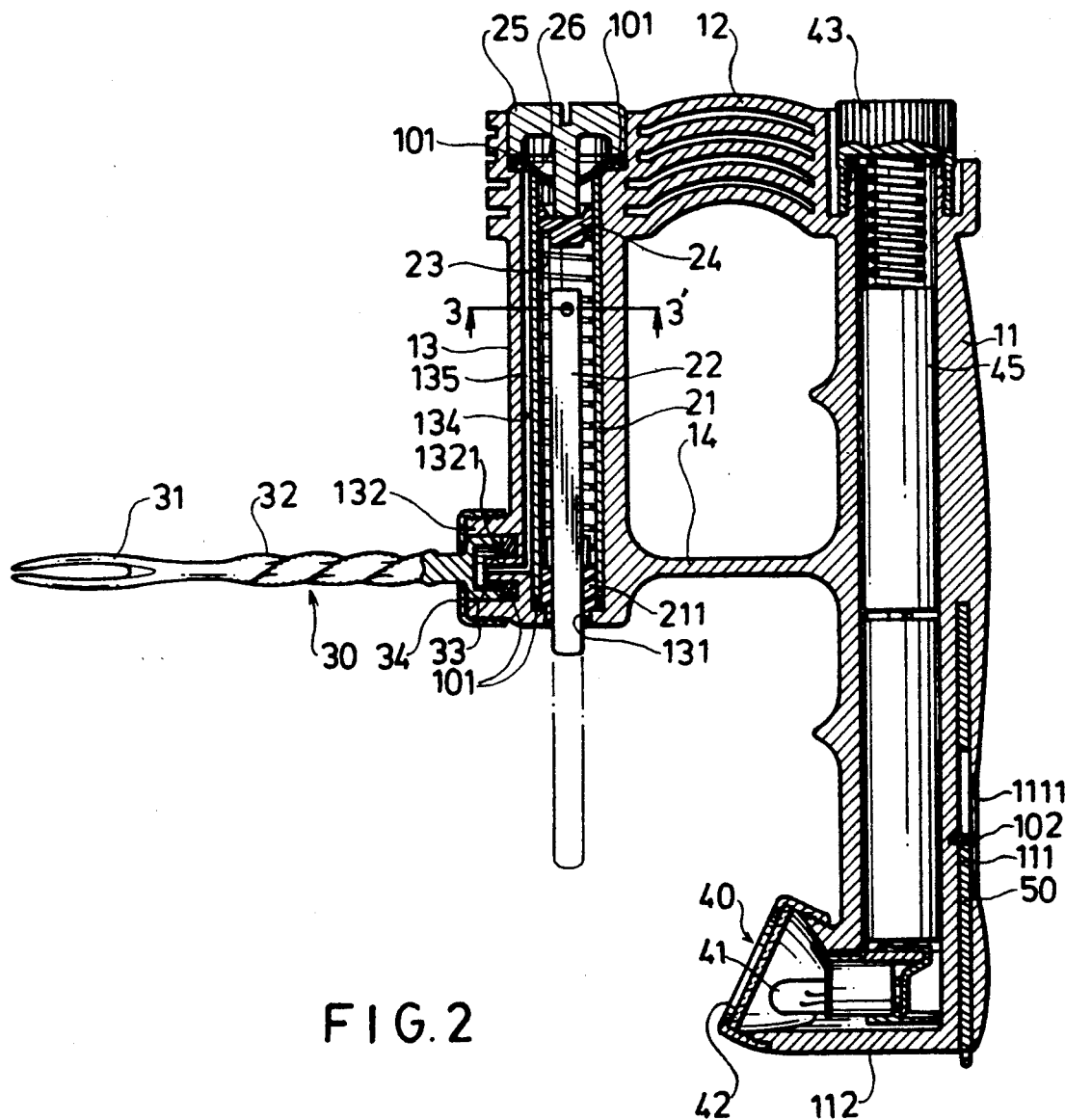
FIG. 2 is a sectional view of the device of FIG. 1.
Figure 3:
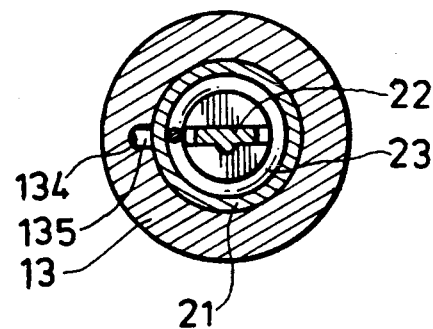
FIG. 3 is a sectional view taken from line 3—3 of FIG. 2.

Referring to FIGS. 1 to 3, a preferred embodiment of this invention comprises a body 10 having a rear grip arm 11 and a front arm 13 which is connected at its upper end with the upper end of the rear grip arm 11 through a connecting part 12 such that the rear grip arm 11 and the front arm 13 are in a U-shape. Another connecting member 14 is provided between the front arm 13 and the rear grip arm 11 below the connecting member 12.

The front arm 13 is tubular and receive a pressure gauge 20 which comprises a pressure cylinder 21 fitted inside the front arm 13. A mouth piece 132 is provided at the front and lower side of the front arm 13 to define a pressure inlet and has a spindle 1321 to push a tire valve to an open position. A sealing ring 101 is provided around the spindle 1321. A longitudinal groove 134 is formed in the inner surface of the wall of the front arm 13 to form an air passage 135. The air passage 135 is communicated with the pressure cylinder 21 at the upper side of the front arm 13.

A screw cap 25 with a sealing member 101 is securely attached to the front arm 13 to seal the upper end of the pressure cylinder 21. An air filter 26 is secured between the upper end of the pressure cylinder 21 and the screw cap 25. A piston 24 is provided in the pressure cylinder 21. The lower end of the pressure cylinder 21 is sealed with a block 211 and the sealing member 101. A compression spring 23 is provided between the piston 24 and the block 211, thereby biasing the piston 24 upward in a normal position A graduated rod 22 is movably mounted to the block 211 and extends into the pressure cylinder 21. When the mouth piece 132 is attached to a tire valve (not shown), the pressure entering the pressure cylinder moves the piston 24 and the graduated rod 22. The operation of the pressure gauge 20 is conventional and is not detailed herein.

The mouth piece 132 has a cylindrical outer periphery which is provided with an external screw thread and an inner periphery with a hexagonal cross-section. A tire repairing tool 30 has a helical ridge 32 and a tool bit 31 with a forked portion which has a converging terminating end. To enable the tire repairing tool 30 to be mounted on the mouth piece 132, it is provided with a mounting end having a threaded mounting cap 34 and a hexagonal insert piece 33. The mounting cap 34 can be screwed to the mouth piece 132 and the insert piece 33 can be fitted in the mouth piece 132. The tool 30 is operated by manipulating the rear grip arm 11.

A flash light device is provided in the rear grip arm 11. The rear grip arm is hollow and slender and has a space to accommodate dry cells 45. At the upper end of the rear grip arm 11 is provided a removable cover 43 to close the cell accommodating space. The lower part of the rear grip arm has a flat closed bottom end 112 and a light emitting head 40 which projects forwardly. The light emitting head 40 comprises a transparent cover 42 and a light bulb 41.

The rear grip arm is further provided with an elongated narrow bore 111 at the rear side of the lower part thereof. The bore 111 is opened at its lower end and receives a slidable tire tread ruler 50. The tire tread ruler 50 has an intermediate oblong hole 52 and a bottom tapered end 51. A screw 102 passes through the oblong hole 52 and is secured in a hole 1112 of the rear grip arm 11, thereby preventing the tire tread ruler 50 from being released out of the bore 111. When the tire tread ruler is in use, the flat closed bottom 112 of the rear grip arm 11 is placed in contact with the surface of the tire and the tapered end 51 of the tire tread is let into a tire tread groove. The tire tread ruler 50 normally projects downward by its weight from the bore 111. The ruler 50 can be lifted manually by pushing a part of the ruler 50 which is exposed through an opening 1111. Since measuring the depth of the tire tread is conventional, the details thereof are not provided herein.

Figure 4:
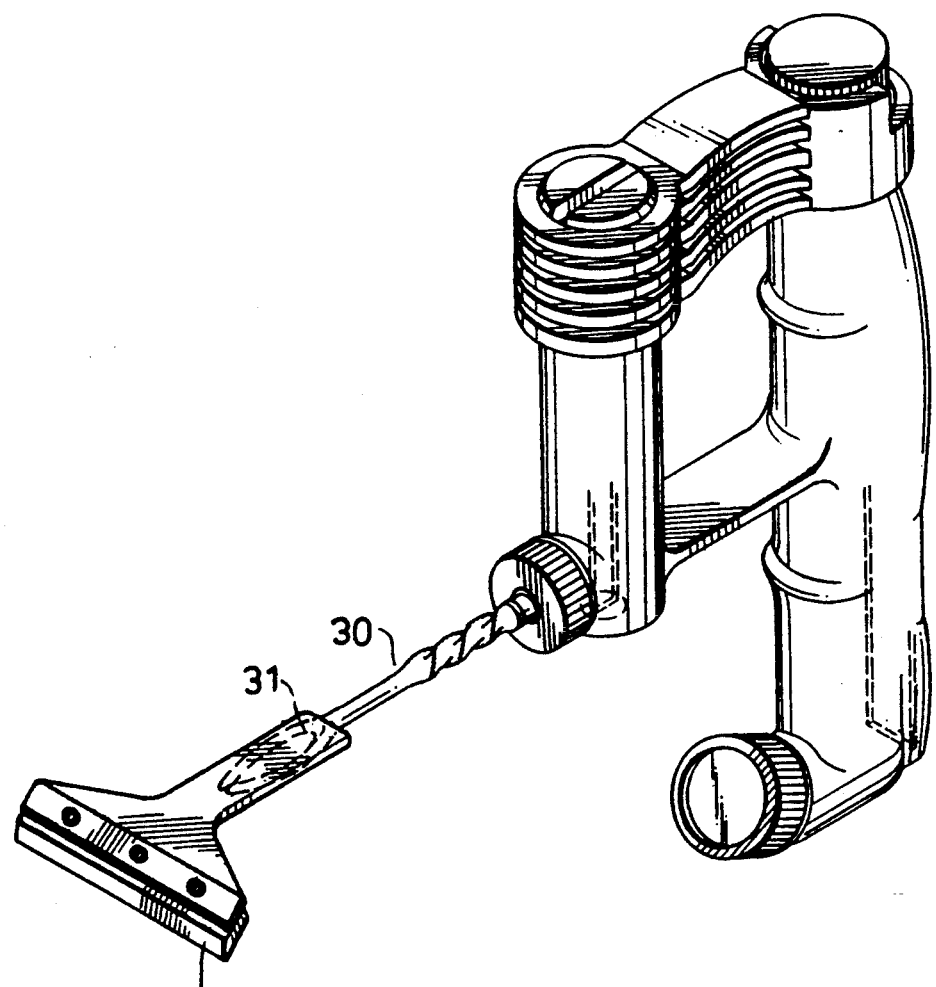
FIG. 4 a perspective view of the device of FIG. 1 but with an additional ice scraper.

FIG. 4 shows another embodiment of this invention which includes components similar to those of the first embodiment and in addition, has an ice scraper 60 which is removably attached to the tire repairing tool thereof.

With the invention thus explained, it is apparent that various modifications and variations can be made without departing from the scope of this invention. Therefore, it is intended that the invention be limited only as indicated in the appended claims.

I claim:

1. A tire monitoring and repairing device comprising:
a body having a front arm having an upper end and a lower end, a rear grip arm having an upper end and a lower end, an upper connecting arm interconnecting said upper ends of said front arm and said rear grip arm to be substantially in a U-shape, and a lower connecting arm below said upper arm and interconnecting said front arm and said rear grip arm, said front arm being tubular, said rear grip arm being hollow and slender and having a lower portion longer than that of said front arm;
a pressure gauge provided in said front arm and having a front side with a mouth piece forming a pressure inlet,
a tire repairing tool to be detachably mounted on said mouth piece,
a flash light device mounted in said rear grip arm and having a light emitting head provided at said lower end of said rear grip arm.

2. A device claimed in claim 1, wherein said lower end of said rear grip arm has a flat closed bottom, said light emitting head projecting forwardly from said lower end of said rear grip arm, said rear grip arm further having an elongated narrow bore opening at said flat closed bottom and a tire tread ruler slidably received in said bore and normally projecting from said flat closed bottom.

3. A device as claimed in claim 1, wherein said flash light device includes a battery received in said rear grip arm and a light bulb provided in said light emitting head.

4. A device as claimed in claim 1, wherein said mouth piece is an annular member projecting adjacent said lower end of said front arm and having an external screw thread, a hexagonal socket and a push spindle inside said hexagonal socket.

5. A device as claimed in claim 4, wherein said tire repairing tool has a rear mounting end screwed to said mouth piece and a tool bit having a helical ridge adjacent to said rear mounting end and a forked portion opposite to said rear mounting end, said forked portion having a converging end.

6. A device as claimed in claim 1, wherein said pressure gauge comprises a pressure cylinder mounted inside said front arm and communicated with said mouth piece, a piston provided in said pressure cylinder, and a graduated rod provided in said pressure cylinder and actuated by said piston.

* * * * *